R. MOHN.
CALCULATING MACHINE.
APPLICATION FILED APR. 14, 1915.
1,145,386. Patented July 6, 1915.
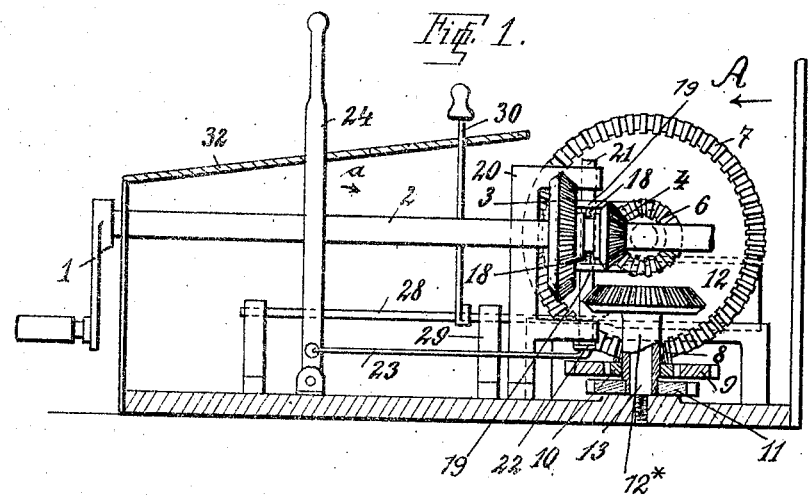
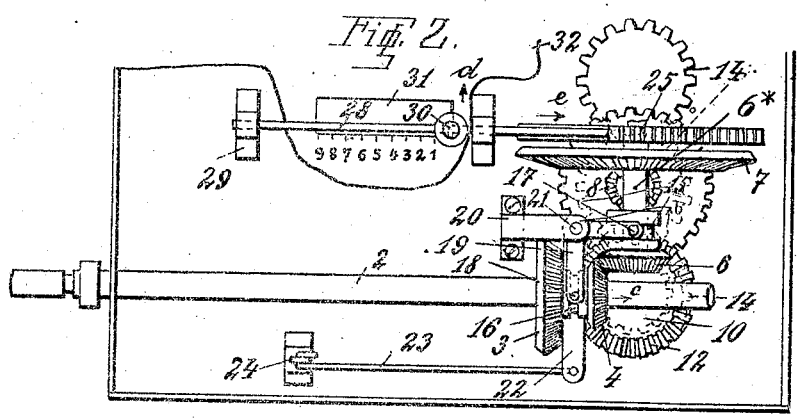
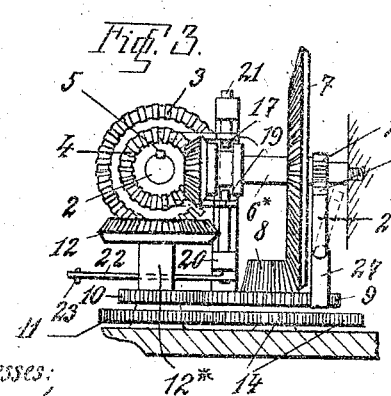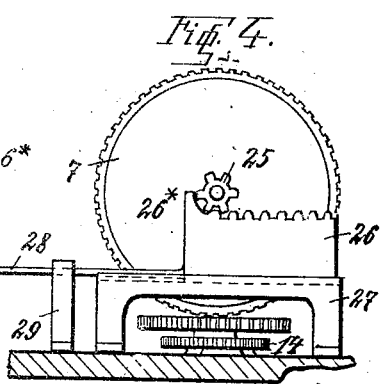
Inventor:
Rudolf Mohn.

UNITED STATES PATENT OFFICE.

RUDOLF MOHN, OF SULGEN, SWITZERLAND.

CALCULATING-MACHINE.

1,145,386.

Specification of Letters Patent.

Patented July 6, 1915.

Application filed April 14, 1915. Serial No. 21,295.

*To all whom it may concern:*

Be it known that I, RUDOLF MOHN, a citizen of Switzerland, and residing at Sulgen, Switzerland, have invented certain new and useful Improvements in Calculating-Machines, of which the following is a specification.

The present invention has reference to improvements in calculating machines, and relates more particularly to auxiliary means in connection with the ordinary actuating mechanism of a calculating machine of the Thomas or like type for greatly simplifying the manipulation of the machine by reducing the number of turns to be given the crank handle in sending a set up item through the machine; and the specific object of the invention is to provide means whereby with the same crank shaft addition, as well as multiplication operations with a multiplier from 1–9, can be carried out, with a single or only a partial crank revolution.

In order to make the invention more readily understood, I will now describe it in detail with reference to the accompanying drawing, in which—

Figure 1 represents a side elevation of the auxiliary mechanism; Fig. 2 a plan view thereof, with the cover partly broken away; Fig. 3 a rear elevation looking in the direction of arrow A in Fig. 1, and Fig. 4 a side view of Fig. 3 in the direction of the arrow B.

The shaft 2 carries at its forward end the crank handle 1 and near its inner end the bevel gears 3 and 4, which are secured thereon by means of the key 5 (Fig. 3) in such manner that they can be axially displaced on the shaft but are prevented from rotation relative thereof. The bevel wheel 4 in its one end position meshes with the bevel wheel 6, which latter is suitably axially displaceable on the shaft 6*, but is not rotatable relative thereto. On the shaft 6* is also fixed the bevel wheel 7 which meshes with the bevel wheel 8. This latter is rigidly secured to the toothed wheel 9 which meshes with the toothed wheel 10, and this latter is fixed on the hub 12* of the bevel wheel 12 together with the toothed wheel 11, so that these three wheels 10, 11 and 12 freely rotate in unison about the stud 13 supporting the common hub 12*. The wheel 11 is connected over the wheel train 14 with the other actuating mechanisms of the machine, which are omitted from the drawing as they have no bearing on the invention.

In the circumferential groove 15 of the hub of the bevel wheel 6 and in the groove 16 of the common hub of the bevel wheels 3 and 4 engage respectively the tappets 17 and 18 supported on the angle levers 19, which latter are pivoted by means of the shaft 21 in the bracket bearing 20, to which latter is also pivoted the swing arm 22 which is connected by the draw rod 23 with the setting lever 24.

On the bevel wheel 7 is secured co-axially thereof the pinion 25 which is adapted to be brought into mesh with the rack bar 26. The latter is pivoted along its lower edge in the support 27 and is provided with a stop ledge 26* and an extension rod 28, the latter being guided in standards 29 and carrying a setting lever 30, whose upper end extends through a slot 31 in the cover plate 32 of the machine case. The sides of this slot bear marks numbered from 1 to 9, and the slot may normally be covered up by a spring-actuated slide, not specially shown in the drawing.

In operating the described mechanism for carrying out an addition, the push lever 24 is shifted in the direction of the arrow *a* (Fig. 1) which causes the bell crank lever 19 to oscillate to such an extent that the wheel 6 is displaced in the direction of arrow *b* (Fig. 2) and the wheels 3 and 4 are shifted in the direction of the arrow *c*, with the result that the wheels 4 and 6 are disconnected and the wheels 3 and 12 are thrown into mesh. The push lever 30 is shifted laterally in the direction of the arrow *d*, which causes the toothed rack 26 to disconnect from the pinion 25, as shown in dotted lines in Fig. 3. If now the crank handle 1 is manipulated, the rotation of the shaft 2 is transmitted in turn through the bevel wheels 3 and 12 to the toothed wheel 11 and over the wheel train 14 to the other mechanisms.

For carrying out multiplications, the set lever 24 is brought into the position in which the bevel wheels 3 and 12 are disconnected and the bevel wheels 4 and 6 are in mesh. Next the lever 30 is shifted in its slot 31 to the mark corresponding to the numeral with which the multiplication is to be carried out, and by oscillating the lever in the direction opposite to that indicated by the arrow *d*, the toothed rack 26 is thrown into gear with the pinion 25, as shown in full lines in Fig. 3. If now the handle 1 is manipulated, the wheels 4 and 6 will cause the wheel 7 to rotate, and the rack bar will be advanced by the pinion 25 in the direction of the arrow $e$, until the stop ledge 26* contacts with the pinion 25 and prevents further movement. The rotation of the wheel 7 is transmitted to the wheel 11 over the wheels 8, 9 and 10, and the wheel 11 then actuates the wheels 14 and the machine mechanism proper.

The ratio of gearing of the bevel wheels 7 and 8 is 9:1, that is to say, the wheel 7 for each complete revolution causes the wheel 8 to rotate nine times, and thus obviously for each single revolution of the handle 1, the toothed wheel 11 will make 9 complete revolutions. It is clear then that the other operating wheels of the machine will proportionately be actuated nine times as extensively, and a "9" multiplication is carried out at a single rotation of the handle, where formerly nine such handle revolutions were required. If a number is to be multiplied by less than "9", the lever 30 is shifted in its slot 31 to the respective multiplier mark, say "7", in consequence of which the actuation of the mechanism is stopped correspondingly earlier, owing to the pinion 25 running up against the now less distant stop ledge 26*. The toothed wheel 11 revolves only seven times and the rest of the mechanism follows suit and the set up item is multiplied by "7". After the multiplication operation the lever 30 is shifted again in the direction of the arrow $d$, when the rack bar 26 is again disconnected from the pinion, which clears the machine for a fresh operation.

What I claim and desire to secure by Letters Patent is:—

1. In a calculating machine, in combination with an adding and a multiplying mechanism, a crank handle and a crank shaft, a pair of bevel gears, rigidly connected and axially displaced on said crank shaft, and means for alternately coupling one of said gears to the adding mechanism and the other to the multiplying mechanism, the latter having a ratio of gearing of 9:1 relative to the last said bevel gear, for the purpose of imparting to the multiplying mechanism an angular velocity nine times as high as that of the crank handle.

2. In a calculating machine, in combination with an adding and a multiplying mechanism, a crank handle and a crank shaft, a pair of bevel gears, rigidly connected and axially displaceable on said crank shaft, means for alternately coupling one of said gears to the adding mechanism and the other to the multiplying mechanism, means for limiting the extent of the actuation of the multiplying mechanism, comprising a pinion driven from the said crank shaft at a ratio of 9:1, a tiltable rack bar, a stop ledge thereon, means for tilting said rack bar into, or out of, mesh with said pinion, and indicator means for shifting said rack bar relative to said pinion according to the multiplier chosen.

In testimony whereof I affix my signature in presence of two witnesses.

RUDOLF MOHN.

Witnesses:
WALTER STANDER,
FRANK TINNEKE.